United States Patent [19]
Herschitz et al.

[11] Patent Number: 4,876,430
[45] Date of Patent: Oct. 24, 1989

[54] PREWELD TEST METHOD

[75] Inventors: Roman Herschitz; Alexander Bogorad, both of Plainsboro; Robert N. Harhigh, Trenton, all of N.J.

[73] Assignee: General Electric Company, East Windsor, N.J.

[21] Appl. No.: 223,497

[22] Filed: Jul. 25, 1988

[51] Int. Cl.$^4$ ............................................. B23K 11/24
[52] U.S. Cl. .................................. 219/110; 219/117.1; 437/2
[58] Field of Search .................. 219/110, 117.1; 437/2

[56] References Cited

U.S. PATENT DOCUMENTS

| | | | |
|---|---|---|---|
| 3,462,577 | 8/1969 | Helms et al. | 219/110 |
| 3,590,372 | 6/1971 | DeSantis et al. | 324/72.5 |
| 3,735,254 | 5/1973 | Severin | 324/64 |
| 3,837,924 | 9/1974 | Baron | 437/2 |
| 3,849,880 | 11/1974 | Haynos | 437/2 |
| 4,176,313 | 11/1979 | Wrinn | 324/62 |
| 4,178,543 | 12/1979 | Wrinn et al. | 324/64 |
| 4,179,652 | 12/1979 | Davis | 324/64 |
| 4,218,650 | 8/1980 | Matzen | 324/62 |

FOREIGN PATENT DOCUMENTS 56160885 5/1984 Japan .

Primary Examiner—Clifford C. Shaw
Attorney, Agent, or Firm—William H. Meise

[57] ABSTRACT

A method for welding together the broad faces of two conductive sheets increases the reliability and consistency from weld to weld. The sheets are accessible from only one side for parallel electrical resistance welding. The electrical resistance between one sheet and the other is measured and taken as an indication of the amount of dirt or corrosion in the interface between the sheets. The measured resistance is compared with a predetermined standard. If the resistance exceeds the standard, the faces are cleaned. If the resistance is below the standard, electrical power is applied to fuse the sheets together.

16 Claims, 3 Drawing Sheets

PREWELD TEST METHOD

BACKGROUND OF THE INVENTION

This invention relates to methods for joining two conductive sheets by welding.

There are many situations in which two sheets of metal or, more generally, two thin electrically conductive sheets are to be joined by welding. The increasing emphasis on reliability to reduce warranty costs in consumer products or to meet stringent reliability requirements in high-tech and military applications requires great consistency from weld to weld.

One method of welding together two sheets of electrically conductive material is to juxtapose the sheets by placing one sheet over the other in the region to be welded, and then sandwiching the sheets between a pair of welding electrodes. A high current is then passed through the electrodes, through the sheets of metal and their interface to thereby heat the metal near the interface to a fusion or welding temperature. In some cases, as when welding a bond wire or interconnection cable to a metallized surface of a semiconductor, it is not possible to apply an electrode to the bottom surface of the two metal sheets to be welded. Other methods may be used for semiconductor welding, as for example, rapidly vibrating one of the pieces to be joined against the other, to thereby generate fusing heat at the moving interface and to concurrently scrape the area clear of oxides and dirt.

Japanese Patent Document No. 56-160885 describes a system for welding semiconductor elements on a substrate including a pair of welding electrodes and means for metering optimum contact resistance between the electrodes and the parts to be welded prior to welding, for achieving optimum contact resistance between the electrodes and the part despite the existence of oxidized films or other foreign material on the parts. A high reliability method is desired for welding together two sheets of conductive material accessible for welding from only one side.

SUMMARY OF THE INVENTION

A method for welding together two sheets of electrically conductive material includes the step of placing a first side of a first sheet of the electrically conductive material in contact with a first side of a second sheet of electrically conductive material at least in a region to be welded. First and second welding electrodes are applied to a second side of the first sheet of material straddling the region to be welded. A third electrode is applied to the second sheet of electrically conductive material adjacent the region to be welded. The electrical resistance between at least one of the first and second electrodes and the third electrode is measured and compared with a predetermined value of electrical resistance. If the measured electrical resistance is below the predetermined value, welding energy is applied between the first and second electrodes to cause fusion between the first and second sheets in the region to be welded. If the measured resistance exceeds the predetermined value, at least a portion of the first side of a sheet in the region to be welded is cleaned. In a particular embodiment of the invention, the third electrode is applied to the first side of the second sheet.

DESCRIPTION OF THE INVENTION

Figure 1:
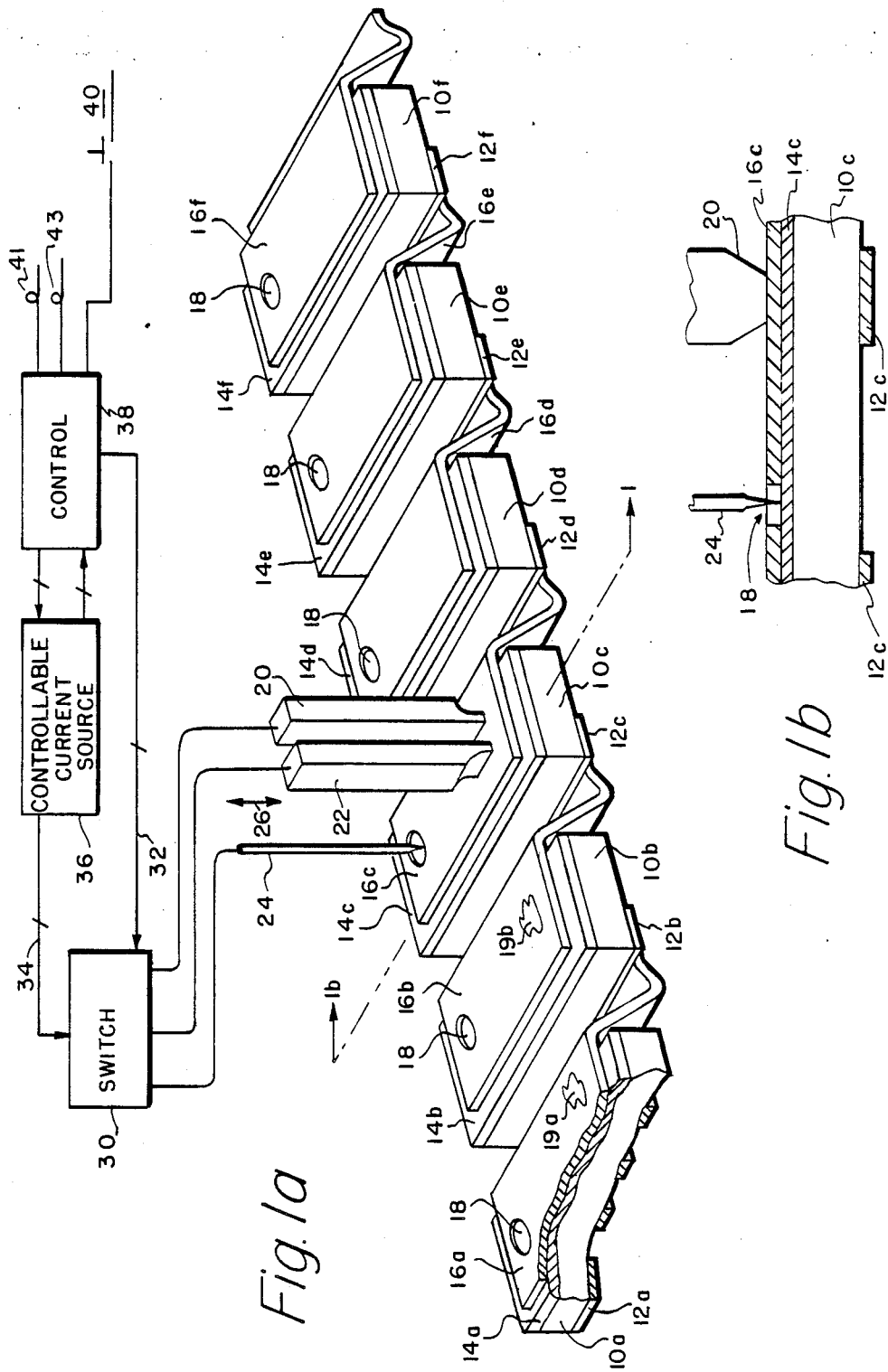
FIG. 1a is a perspective or isometric view of a welding arrangement and a workpiece according to the invention, together with a block diagram of a welding arrangement in accordance with the invention.
FIG. 1b is a cross-section of a portion of the arrangement of FIG. 1a and FIGS. 1a and 1b are together referred to as FIG. 1.

The particular problem to which the invention is directed arose out of the need to improve the reliability of solar array panels intended for use in a low earth orbit in which they are subjected to a large number of heating and cooling cycles. Such panels, when made up from solar cells including metallized portions soldered to interconnecting strips, may not have the desired level of reliability due to failures at the solder connections. The welding system illustrated in FIG. 1 provides improved reliability. In FIG. 1a, a plurality of individual solar cells 10a, 10b, 10c . . . 10f are illustrated as rectangles which are spaced apart to more clearly illustrate their separate nature, but which may be contiguous or closely juxtaposed to maximize the amount of surface coverage and to thereby minimize the length of interconnections. Each individual solar cell 10 includes a bottom metallization 12. Thus, solar cell 10a includes a bottom metallization 12a, solar cell 10c includes a bottom metallization 12c, etc. Bottom metallizations 12 of the solar cells are interconnected in the final array by a welding method according to the invention, which is not described in detail but which will be obvious from the description herein. The bottom metallizations include a relatively wide portion adjacent a long edge and strips extending across the bottom of the solar cell which leave large portions non-metallized for penetration by photons of light.

Each individual solar cell 10 also includes an upper metallization contact 14 which essentially covers the top surface. Thus, solar cell 10a has disposed upon its upper surface a metallization surface 14a, solar cell 10b has a metallization surface 14b, etc. The disposition of the upper and lower metallization surfaces of solar cell 10c is more clearly visible in the cross-section of FIG. 1b, taken at section lines 1b—1b of FIG. 1a.

The upper metallization of each solar cell 10 is connected to the wide portion of the bottom metallization 12 of the next adjacent solar cell on one side by means of a conductive connection strip 16. Thus, upper metallization 14b of solar cell 10b is connected by strip 16b to bottom metallization 12c of solar cell 10c, and upper metallization 14c of solar cell 10c is connected by strip 16c to bottom metallization 12d of solar cell 10d. Each conductive strip 16 is welded to each of the associated metallizations of the solar cells to interconnect the contacts to form a series circuit.

As illustrated in FIG. 1a, the welding process is accomplished by an apparatus including a first welding electrode 20, a second welding electrode 22, and a third auxiliary electrode 24. Welding electrodes 20 and 22 are desirably made from copper for high conductivity and are tipped with molybdenum (Mb), which has a high melting temperature, for low wear. Electrodes 20, 22, and 24 are held in a mutually spaced relationship by a holder (not illustrated) which is capable of up and down motion relative to the upper surface of the solar cells, as illustrated by two-headed arrow 26. Electrodes 20, 22 and 24 are electrically isolated from each other when not in contact with a conductive strip 16. Electrodes 20, 22, and 24 are connected by conductors of suitable size to a switch arrangement illustrated as a block 30. Switch arrangement 30 receives control signals over a conductor set 32 and electrical power over a conductor set 34 for applying voltage or current to pairs of electrodes 20, 22, and 24 under the command of a control circuit illustrated as a block 38.

In operation, electrode set 20, 22 and 24 is moved relative to the array of solar cells by either stepping the solar cell array under the set of electrodes or by moving the set of electrodes along the array. As illustrated in FIG. 1a, each conductive strip 16 defines an aperture 18 along one edge thereof. The aperture size is much smaller than the surface of the solar cell, and are located so that at least one aperture 18 overlies each metallization 14 of solar cell 10. Welded regions 19a and 19b connect a strip 16 to upper metallization contact 14a and 14b of solar cells 10a and 10b, respectively. In the relative position illustrated in FIG. 1a, electrode set 20, 22, 24 is above solar cell 10c, in readiness for commencement of a welding operation in accordance with the invention.

Welding of an interconnecting strip 16 to upper metallization contact 14c of solar cell 10c is accomplished by adjusting the position of strip 16c so that electrode 24, when lowered, passes through aperture 18 in strip 16c without touching the edges thereof. If desired, all but the tip of electrode 24 may be coated with a layer of insulation (not illustrated) in order to aid in avoiding any unwanted contact between electrode 24 and conductive strip 16c. Electrodes 20 and 22 are lowered into contact with conductive strip 16c.

With electrodes 20 and 22 in contact with the upper surface of connector strip 16c and with electrode 24 in contact with the upper surface of metallization contact 14c, a switch or pushbutton illustrated as 40 is closed by an operator to initiate the welding procedure. Switch 40 is connected to a control circuit illustrated as a block 38. The welding procedure begins with control block 38 setting a controllable current source 36 to produce a relatively low voltage, and also setting switch 30 to a position in which controllable current source 36 applies the voltage between electrodes 20 and 22 to cause a relatively low current, such as one ampere, to flow. Theoretically, the switches of block 30 have zero resistance, and consequently measurements of electrode voltage may be made at controllable current source 36. Those skilled in the art will realize that measurements of electrode voltage may be made on the electrode side of switch block 30 if the switch or other circuit resistances are significant. Signals representing the measured voltage and the resulting current are coupled from controllable current source 36 to control block 38. The ratio of the voltage applied across electrodes 20 and 22 to the resulting current is calculated to determine the resistance. Naturally, source 36 may be set to produce a known current, and the resistance may be determined from the resulting voltage.

The resistance through the circuit including electrodes 20 and 22 is compared with a predetermined standard resistance. The resistance in this circuit includes the resistances of the two electrodes 20 and 22, the resistance at the contact interface between each electrode 20, 22 and connector strip 16c, and the resistance of strip 16c *in the gap between electrodes 20 and 22. Since connector strip 16 is in contact with the surface of metallization 14c* of solar cell 10c, the resistance of connector strip 16 is influenced by the resistance of metallization 14c and by the contact resistance between connector strip 16 and metallization 14c. The resistances of electrodes 20 and 22, and the resistance of strip 16, whether or not paralleled by metallization 14c, are cumulatively relatively small by comparison with the contact resistance between an electrode 20, 22 and connector strip 16 when the tip of the electrode is dirty or eroded. Consequently, the predetermined resistance value with which the measured value of resistance is compared can be set well above the sum of the resistances of the two electrodes and of the contact strip so that clean, uneroded electrodes tips will seldom exceed the threshold, but dirty or eroded tips will almost always cause the threshold to be exceeded.

If the measured resistance between electrodes 20 and 22 exceeds the predetermined standard value, control block 38 ceases the welding process and illuminates a warning lamp illustrated as 41 to indicate to the operator that the tips of the welding electrodes 20, 22 should be cleaned. The cleaning operations are standard and not a part of the invention.

If the measured resistance is below the predetermined standard, the electrode tips must be clean, and the logic of control block 38 proceeds to the next step of the operation. In the next step, control block 38 operates switch 30 to disconnect one of electrodes 20, 22 from the circuit and to connect the output voltage of controllable source 36 across electrode 24 and the remaining one of electrodes 20 and 22. Concurrently with operation of switch 30, control block 38 sets controllable current source 36 to a low voltage condition. A voltage applied to electrode 24 relative to (for example) electrode 20 causes current to flow through electrodes 20 and 24, vertically through connection strip 16c, through the point or points of contact between connection strip 16 and metallization 14c, laterally through metallization 14c to a point under electrode 24 and through the point of contact between electrode 24 and metallization 14c. The resistances of electrodes 20 and 24 are relatively small, and the resistance at the interface between electrode 24 and metallization 14c is also relatively small because of the large pressure per unit area attributable to the small tip diameter of electrode 24. The previous resistance measurement also established that the contact resistance between electrode 20 and connection strip 16c is relatively low. One remaining unknown resistance is the contact resistance between connection strip 16c and metallization 14c. This resistance can be increased by the presence of dirt or oxides at the interface. Such dirt or oxides are in the region in which fusion will take place during welding, and may adversely affect the reliability of the resulting weld. The resistance to the flow of current between electrodes 20a and 24 is compared with a standard resistance which is set high enough so that clean facing surfaces of conductive sheet 16c and metallization 14c never cause the threshold to be exceeded but dirty or oxidized surfaces almost invariably cause the threshold to be exceeded. Control block 38 responds to the comparison between the measured resistance the threshold to either proceed with the next step in the welding operation if the resistance is low, or if high to interrupt the welding procedure and illuminate a lamp illustrated as 43 to indicate to the operator that the welding procedure has been interrupted and that the interface between connection strip 16c and metallization 14c requires cleaning.

If the resistance between electrodes 20 and 24 is below the predetermined threshold, control block 38 proceeds by disconnecting electrode 24 from the circuit and reconnecting electrodes 20 and 22 across the output of controllable source 36. Concurrently, control block 38 also sets controllable current source 36 to the welding conditions (high voltage or current) and energizes the source to apply voltage across or current through electrodes 20 and 22 to effectuate the weld.

Figure 2:
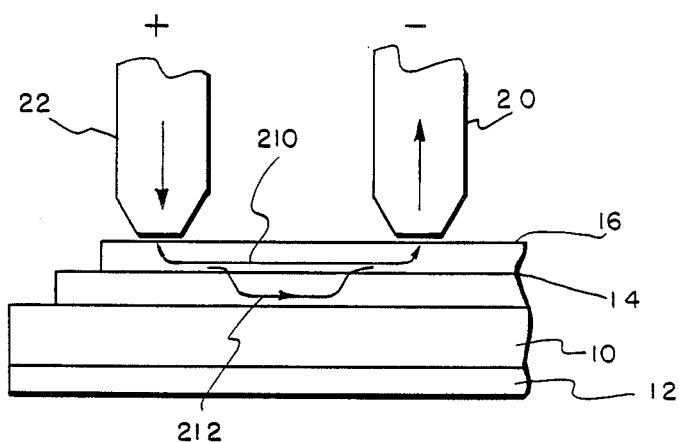
FIG. 2 is a representation of an elevation cross-section of the workpiece FIG. 1 with welding electrodes in place, illustrating the flow of welding current.

FIG. 2 is a cross section of the structure of FIG. 1a with welding electrodes 20, 22 in contact with the upper side of connection strip 16. As illustrated in FIG. 2, welding electrode 22 is made relatively positive (+) and electrode 20 relatively negative (−). Conventional current flows in the direction illustrated by the arrows, a portion illustrated as 210 flowing laterally through connection strip 16 between the electrodes, and another portion 212 flowing through metallization 14. The magnitude of the current portions 210, 212 is selected to be large enough so that the energy per unit time (power) dissipated in the internal resistance of the conductors raises the material to fusion temperature, thereby causing a fusion or welding of the connection strip 16 to metallization 14 at a location between the welding electrodes. Control block 38 then turns off source 36 and raises the electrodes preparatory for the next command to again perform the welding routine. It may also reposition the solar cell array under the welding electrodes in readiness for welding cell 10d. The programming of control block 38 to perform the described routine is believed to be well within ordinary skill in the art and is not described in detail. The method as described provides consistent welds because welds are not made through dirty or corroded interfaces.

Figure 3:
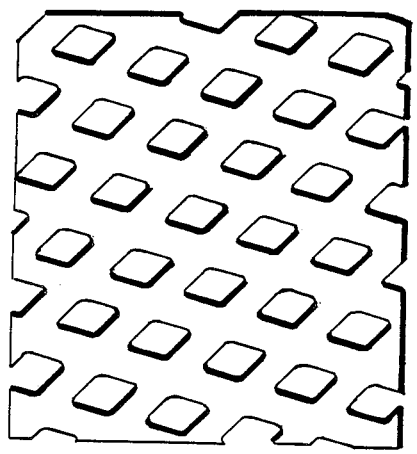
FIG. 3 is a tracing of a photomicrograph of a portion of the workpiece illustrated in FIG. 1.

Each connection strip 16 is desirably made from an expanded metal mesh or from an etched mesh. FIG. 3 illustrates a tracing of a photomicrograph of a portion of an etched mesh having diamond-shaped perforations. It has been found that if the tips of welding electrodes 20 and 22 are pointed, the point when lowered may land on a single interconnection connection strip of the mesh. When the high welding current is applied, this may undesirably result in melting of the strip which happens to be directly underneath the welding electrode. This is avoided by welding electrodes shaped as illustrated in FIG. 1, having the form of a blade which makes contact with more than one connection strip of the mesh, which thereby eliminates the problem.

Other embodiments of the invention will be apparent to those skilled in the art. If desired, the up-and-down motion of electrode 24 may be independent of the motion of electrodes 20 and 22, and electrode 24 may be lowered into contact with the associated metallization only when connections are made thereto by switch 30. Instead of disconnecting one of electrodes 20, 22 during resistance tests in conjunction with electrode 24, switch 30 may connect electrodes 20 and 22 in common, to reduce the effect of contact resistance. Also, a further step may be added, measuring the sheet interface resistance by the use of two slightly different paths, first between electrodes 20 and 24 and then between electrodes 22 and 24. If conductive strip 16 is a woven mesh, discrete apertures 18 may not be required if electrode 24 is insulated along its length, as electrode 24 can penetrate the mesh by pushing aside mesh wires. The welding current may be alternating (AC) or direct (DC), and may be controlled in amplitude and/or duration. While indicator lamps have been described, buzzers, liquid crystal displays, or any other type of annunciator or display may be used. An inert gas may be used to prevent oxidation during welding.

What is claimed is:

1. A method for welding together two sheets of electrically conductive material, comprising the steps of:
    placing a first side of a first sheet of electrically conductive material in contact with a first side of a second sheet of electrically conductive material in a region to be welded;
    applying first and second electrodes to a second side of said first sheet straddling said region to be welded;
    applying a third electrode to said second sheet adjacent said region to be welded;
    measuring the electrical resistance between at least one of said first and second electrodes and said third electrode;
    comparing said electrical resistance with a predetermined value;
    if said electrical resistance is below said predetermined value, applying electrical welding energy between said first and second electrodes;
    if said electrical resistance exceeds said predetermined value, cleaning said first and second electrical sheets about said region to be welded and repeating said sheet placing, electrode applying, measuring, comparing and applying steps.

2. A method for connecting two conductive sheets together, comprising the steps of:
    juxtaposing said sheets in a region to be connected;
    pressing against an outer surface of one of said sheets near said region to be connected the working surfaces of first and second spaced-apart electrodes;
    pressing against the other of said sheets a third electrode;
    applying a first voltage between said first and second electrodes, measuring the resulting first current, and comparing the ratio of said first voltage to said resulting first current with a first predetermined ratio;
    cleaning at least said working surfaces if said ratio of said first voltage and said resulting first current exceeds said predetermined ratio;
    applying a second voltage between said third electrode and at least one of said first and second electrodes, measuring the resulting second current, and comparing the ratio of said second voltage to said resulting second current with a second predetermined ratio;
    cleaning at least a portion of the juxtaposed portion of said sheets in said region to be connected if said ratio of said second voltage to said resulting second current exceeds said second predetermined ratio; and
    applying to said first and second electrodes a third voltage sufficient to cause a third current to flow which is greater than either said first or second currents only if said ratio of said first voltage to said first current is below said first predetermined ratio and said ratio of said second voltage to said second current is below said second predetermined ratio.

3. A method according to claim 2, wherein said first and second voltages are equal.

4. A method according to claim 2, wherein said first and second predetermined ratios are equal.

5. A method according to claim 2, wherein said step of pressing against the other of said sheets a third electrode follows said step of applying a first voltage.

6. A method according to claim 2, wherein said step of applying a second voltage comprises the steps of:
applying said second voltage between said third electrode and said first electrode, and comparing the ratio of said second voltage to said resulting second current with said second predetermined ratio;
applying a fourth voltage between said third electrode and said second electrode, and comparing the ratio of said fourth voltage to the resulting fourth current with a predetermined fourth ratio.

7. A method according to claim 6, wherein said second and fourth predetermined ratios are equal.

8. A method according to claim 6 further comprising the step of:
cleaning at least a portion of said juxtaposed portion of said sheets in said region to be connected if said ratio of said fourth voltage to said fourth current exceeds said fourth predetermined ratio.

9. A method according to claim 2 wherein at least said one of said two conductive sheets is perforated and said step of pressing said third electrode comprises the further step of:
orienting said one of said sheets relative to said third electrode so that said third electrode passes through a perforation in said one sheet to contact said other one of said sheets.

10. A method according to claim 2 wherein said step of cleaning at least said working surfaces comprises the step of cleaning said outer surface of said one of said sheets about the region of contact with at least one of said first and second electrodes.

11. A solar panel including individual solar cells each of which includes at least one metallic contact, comprising:
a thin metallic strip including a first face overlying and contiguous with said metallic contact in a region to be welded, said strip also including a second face, said strip being welded to said contact by (a) applying first and second welding electrodes to said second face of said strip at locations straddling said region to be welded and also applying a third electrode to a point on said metallic contact adjacent to said region to be welded, (b) measuring the value of a first resistance between said first and second electrodes and cleaning at least one of the interfaces between said first and second electrodes and said second face of said metallic strip if said first resistance exceeds a predetermined value, (c) measuring the value of a second resistance between said third electrode and at least one of said first and second electrodes and cleaning at least a portion of the interface between said metallic contact and said first face of said strip if said second resistance exceeds a predetermined value, and (d) applying electrical power between said first and second electrodes for causing fusion between said metallic contact and said strip.

12. A panel according to claim 11 wherein said strip is made principally from silver.

13. A panel according to claim 12 wherein said metallic contact is made principally from silver.

14. A panel according to claim 11 wherein said strip includes perforations.

15. A panel according to claim 14 wherein said point lies under one of said perforations.

16. A method for welding two sheets of material joined along their broad surfaces, comprising the steps of:
comparing the electrical resistance between said sheets near the region to be welded with a standard resistance; and
only if said electrical resistance is below said standard value, applying electrical welding power only from the exposed side of one of said two sheets.

* * * * *